(12) United States Patent
Iwata et al.

(10) Patent No.: US 6,772,431 B2
(45) Date of Patent: Aug. 3, 2004

(54) DISC-LIKE INFORMATION RECORDING MEDIUM, STAMPER, STAMPER CONFIGURING APPARATUS, DISC MASTER AND HUB MOUNTING APPARATUS

(75) Inventors: Noboru Iwata, Tenri (JP); Junji Hirokane, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 161 days.

(21) Appl. No.: 09/920,852

(22) Filed: Aug. 3, 2001

(65) Prior Publication Data

US 2002/0034154 A1 Mar. 21, 2002

(30) Foreign Application Priority Data

Aug. 4, 2000 (JP) .................................. 2000-237266

(51) Int. Cl.[7] .................................................. G11B 7/00
(52) U.S. Cl. ........................................................ 720/746
(58) Field of Search ................................ 369/282, 271, 369/180, 195, 206, 270, 272, 290, 258, 133

(56) References Cited

U.S. PATENT DOCUMENTS 5,010,435 A  *  4/1991  Shiba et al. ................. 360/133
5,272,581 A  * 12/1993  Kojima et al. ............ 360/98.01
5,987,003 A  * 11/1999  Yokota ......................... 369/280
5,999,513 A  * 12/1999  Arakawa et al. ............. 369/282
6,002,663 A  * 12/1999  Sandstrom .................... 369/282
6,154,441 A  * 11/2000  Sandstrom et al. .......... 369/282
6,285,651 B1 *  9/2001  Boutaghou et al. ......... 369/270
6,292,461 B1 *  9/2001  Kikuchi et al. .............. 369/290
6,449,124 B1 *  9/2002  Hoyle .......................... 360/133
6,490,241 B1 * 12/2002  Doering ....................... 369/282
6,522,620 B1 *  2/2003  McPherson et al. ...... 369/275.3

FOREIGN PATENT DOCUMENTS

JP             414747        1/1989

* cited by examiner

Primary Examiner—Tianjie Chen
(74) Attorney, Agent, or Firm—Birch, Stewart, Kolasch, & Birch, LLP.

(57) ABSTRACT

A disc recording element is provided with a disc substrate having a hole at its center, a circular information recording area on its surface that is concentric with the hole. A hub is fitted to the hole. The disc substrate has a relief portion thereon for position alignment of the hub.

16 Claims, 12 Drawing Sheets

US 6,772,431 B2

DISC-LIKE INFORMATION RECORDING MEDIUM, STAMPER, STAMPER CONFIGURING APPARATUS, DISC MASTER AND HUB MOUNTING APPARATUS

CROSS-REFERENCE TO RELATED APPLICATION

This application is related to Japanese Patent Application No. 2000-237266 filed in Aug. 4, 2000, whose priority is claimed under 35 USC §119, the disclosure of which is incorporated by reference in its entirety.

BACKGROUND OF THE INVENTION

1. Field of the Invention

The present invention relates to a disc-like information recording medium represented by an optical disc, optical magnetic disc or phase change optical disc, a disc master and a stamper for manufacturing the disc-like information recording medium, a stamper configuring apparatus for configuring the stamper, and a hub mounting apparatus for mounting a hub to the disc-like information recording medium.

2. Description of the Related Art

There has widely been known a method for fitting a hub into a central hole and adhering the hub by an ultraviolet curing resin in order to increase a disk rotational speed of the disc-like information recording medium such as an optical disc, optical magnetic recording medium, phase change medium or the like made by laminating a transparent dielectric film, magnetic film, reflective film, or the like on a disc substrate.

A manufacturing method of the disc-like information recording medium will be explained hereinbelow with reference to FIGS. 22 to 26 taking an example of a manufacturing method of a conventional optical magnetic recording medium.

FIG. 22 is a typical perspective view of a conventional optical magnetic recording medium. The conventional disc-like information recording medium has a stamper holding channel 103 and an information recording area 102 formed by a guide track or pit line on a disc substrate 101. The disc substrate 101 is made of a resin such as polycarbonate or the like molded by an injection molding method. Laser beam is collectively irradiated to the guide track for recording and reproducing information.

FIG. 23 is a typical perspective view of a disc master for manufacturing the conventional optical magnetic recording medium. A silica glass disc or soda-lime glass is used as a substrate 101 of the disc master. A photosensitive resist is applied to the substrate. Thereafter, a desired guide track or pit line is exposed and developed to form the information recording area 102, thereby obtaining the conventional optical magnetic recording medium. After forming a metal film such as Ni, Ta or the like on the disc master as an electrode film, an electroforming process is executed by using a doping of Ni metal plating, to thereby obtain an Ni stamper.

The Ni stamper is generally formed to have a thickness of 0.2 mm to 0.5 mm. The guide track or pit line formed on the disc master is transferred to the Ni stamper.

The inside and outside diameters of the stamper are stamped out so as to match with the shape of the injection molding apparatus that is for molding the Ni stamper into the disc substrate 101, and then, it is mounted to the injection molding apparatus. Resin such as polycarbonate or the like is melted to be flown into the molding for forming the disc substrate 101.

Formed on the disc substrate 101 by a sputtering apparatus are dielectric film, metal magnetic film and reflective film. Thereafter, a back coat resin is applied thereon for coating the film to thereby obtain optical magnetic recording medium.

As shown in FIG. 24, a hub 108 mounted to the optical magnetic recording medium and having a collar portion is usually used. A ultraviolet curing resin or thermal curing resin is applied to the position where the collar portion is in contact with the disc substrate 101 for adhering the hub 108 to the disc substrate 101.

There has conventionally been used a method for detecting the position of the guide track or pit line with an optical technique to perform a position alignment with the hub 108 in order to reduce the eccentricity of the disc-like information recording medium by coinciding the rotational center of the disc substrate 101 to which the hub 108 has already been installed with the rotational center of the information recording area 102 formed on the disc substrate 101 and provided with the guide track or pit line.

FIGS. 25 and 26 respectively show a schematic view of a conventional hub mounting apparatus. As shown in FIGS. 25 and 26, the conventional hub mounting apparatus has a disc supporting table 105 and hub fixing member 106 wherein the hub 108 is supported by the hub fixing member 106.

In case where the hub 108 is mounted by using the ultraviolet curing resin, the ultraviolet curing resin is applied in advance to the portion on the disc substrate where the hub is installed (opposite to the collar portion).

The optical center position alignment is performed on the disc supporting table 105 to the disc substrate 101 to which the ultraviolet curing resin is applied for coinciding the rotational center of the guide track or pit line with the center of the hub 108. Thereafter, the hub fixing member 106 moves downward for installing the hub 108 to the disc substrate 101. Ultraviolet ray is irradiated to the disc substrate 101 to which the hub 108 is installed for fixing the hub 108 to the disc substrate 101.

However, the conventional position alignment method requires an optical position alignment with respect to the individual medium, resulting in entailing a problem of taking more time for mounting the hub with high precision and being costly to make an apparatus for performing the position alignment. In order to solve the above problems, Japanese Unexamined Patent Publication No. SHO 64(1989)-14747 discloses a method for performing the position alignment of the disc substrate 101 and the hub 108 with a stamper holding plate for installing the stamper to the injection molding apparatus, with a channel 103 (see, FIG. 22) formed on the disc substrate being as a guide. However, this method causes a shift of the mounting position due to a tolerance between the inside diameter of the stamper and the outside diameter of the stamper holder, thereby entailing a drawback of shifting the rotational center of the information recording area 102 from the rotational center of the hub 108. Therefore, this method has a problem of increasing the eccentricity in case where the precision upon stamping out the stamper is low.

The present invention is established to solve the above-mentioned problems, and aims to provide a disc-like information recording medium having extremely small eccentricity with a hub by precisely performing a position alignment of a disc substrate and a hub with a simple method.

SUMMARY OF THE INVENTION

The present invention provides a disc-like recording medium provided with a disc substrate having a hole at its center and a circular information recording area at its surface that is concentric with the hole, and a hub that is fitted to the hole, wherein the disc substrate has a relief portion thereon for position alignment of the hub. Further, the invention provides a stamper, a stamper configuring apparatus, a disc master and a hub mounting apparatus.

DESCRIPTION OF THE PREFERRED EMBODIMENTS

The relief portion may have a step portion having a height of 0.1 mm or more with respect to the surface of the disc substrate in this invention.

The relief portion may be a depression or projection formed on the surface of the disc substrate.

The relief portion may be a circular depression or projection having an inside diameter greater than the diameter of the hole concentrically formed with the hole.

The relief portion may be a circular depression or projection formed along the circumference of the hole.

The stamper for manufacturing the disc-like information recording medium according to the present invention may have a relief portion corresponding to the relief portion of the disc substrate.

The disc master for manufacturing the disc-like information recording medium according to the present invention may have a relief portion corresponding to the relief portion of the disc substrate.

A stamper configuring apparatus for configuring the stamper may have a stamping processing section for configuring the stamper by a stamping process and a pressing processing section for forming the relief portion of the stamper by a pressing process simultaneous with the stamping process.

The press processing section may desirably have a relief portion forming section for forming the relief portion of the stamper and holding sections for holding therebetween a peripheral part of the relief to be formed. Thereby, the relief portion can be formed with high precision in shape and position.

A hub mounting apparatus for mounting the hub on the disc-like recording medium according to the present invention may have a positioning member to be fitted to the relief portion of the disc substrate, wherein the hub is installed to the disc substrate with the positioning member being fitted to the relief portion.

The present invention will be explained in detail with reference to the embodiments shown in the figures. It is to be noted that the invention is not limited to these embodiments.

[First Embodiment]

The first embodiment will be explained hereinbelow in detail with reference to FIGS. 1 to 4.

Figure 1:
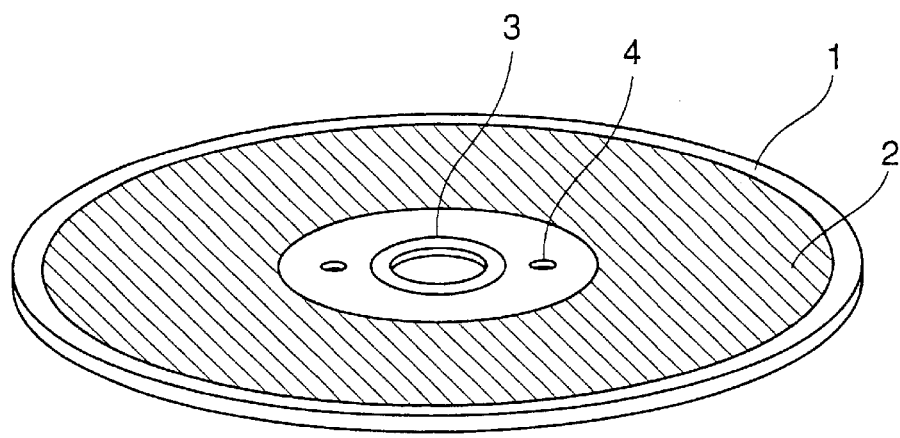
FIG. 1 is a typical perspective view of a disc-like information recording medium according to a first embodiment of the present invention.

A disc-like information recording medium of the present embodiment has, as shown in FIG. 1, a disc substrate 1 having an information recording area 2 that is provided with guide tracks or pit lines, and a stamper holding channel 3 formed by a stamper holder for installing a stamper to an injection molding apparatus when the disc substrate 1 is injected into a mold. Further, the disc-like information recording medium 1 has two hemispherical depressions 4 formed outside of the stamper holding channel 3 as well as inside of the information recording area 2.

Figure 2:
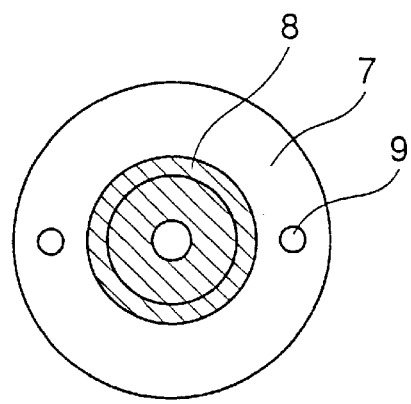
FIG. 2 is a bottom view of an essential part of a hub mounting apparatus used in the first embodiment.
Figure 3:
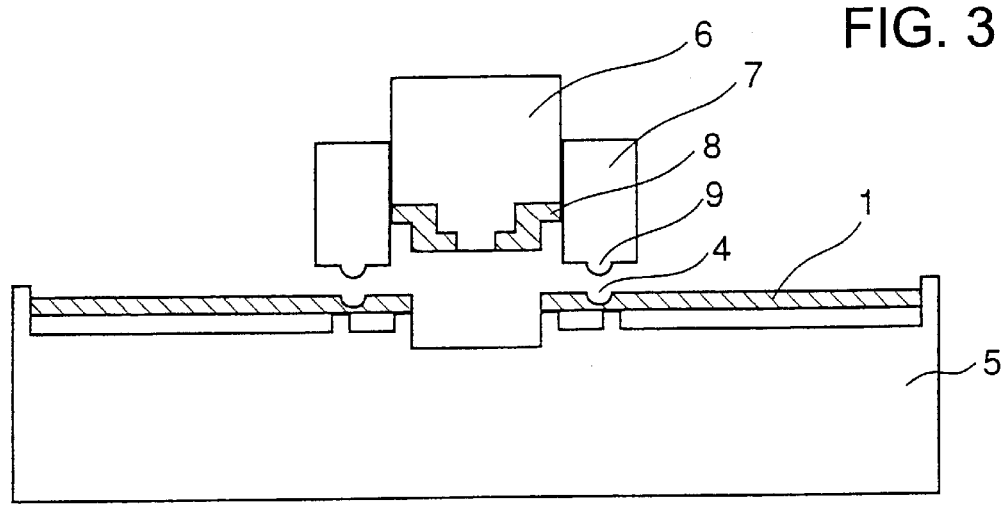
FIG. 3 is a partial sectional side view of the hub mounting apparatus used in the first embodiment.

As shown in FIGS. 2 and 3, a hub mounting apparatus for mounting a hub 8 to the disc-like information recording medium is provided with a disc supporting table 5, a hub fixing member 6 and a positioning member 7, wherein the hub 8 is secured to the hub fixing member 6. The positioning member 7, which is for performing position alignment of the disc substrate 1 and the hub 8, is provided with two hemispherical projections formed on its surface that is in contact with the disc substrate 1. These two hemispherical projections are formed at the position respectively corresponding to two hemispherical depressions 4 formed on the disc substrate 1. The positioning member 7 can be operated independent of the hub fixing member 6 that is provided for mounting the hub 8 to the disc substrate 1.

Figure 4:
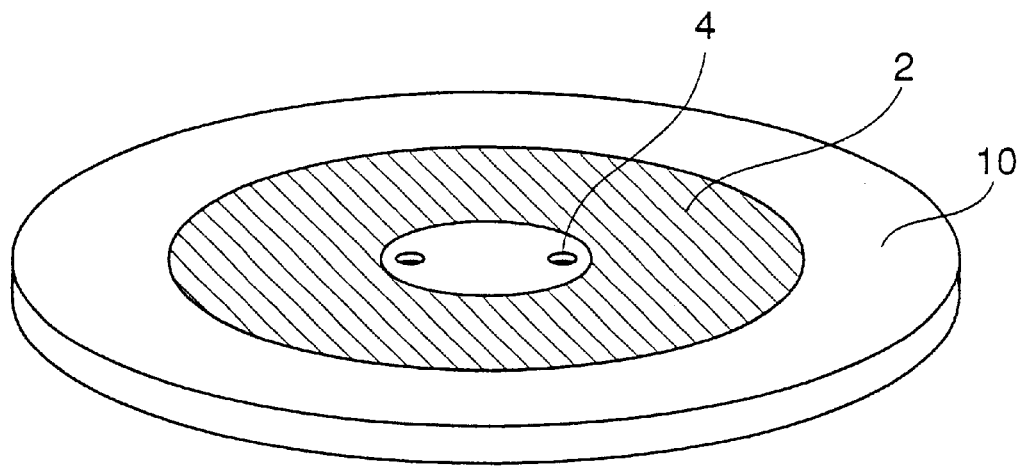
FIG. 4 is a typical perspective view of a disc master for manufacturing the disc-like information recording medium shown in FIG. 1.
Figure 5:
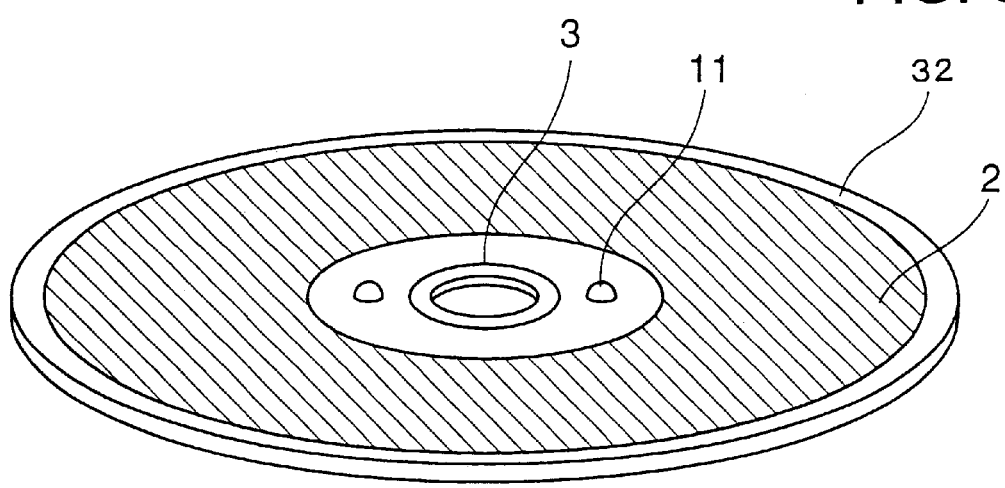
FIG. 5 is a typical perspective view of a disc-like information recording medium according to a second embodiment of the present invention.

The following explanation shows a manufacturing process of the disc-like information recording medium of the present embodiment. FIG. 4 shows a typical perspective view of a disc master for manufacturing the disc-like information recording medium according to the present invention.

In the present embodiment, a silica glass disc is used as a substrate 10 of the disc master for manufacturing the disc-like information recording medium, that is the same as in the first and second embodiment. Two hemispherical depressions 4 are formed by a machinery process in advance at the inside of the information recording area 2 on which guide tracks or pit lines are arranged, each of which has a depth of 0.2 mm.

Each of these two hemispherical depressions 4 has a shape which is removably fitted to two projections 9 formed on the positioning member 7 of the hub mounting apparatus. The distance between the centers of two depressions 4 formed on the substrate 10 is adjusted so as to be equal to the distance between the centers of two projections 9 formed on the positioning member 7.

The substrate 10 provided with two depressions 4 are installed to a spinning coater for uniformly applying a photosensitive positive resist with a thickness of 100 nm on the side outside of the portion where two depressions 4 are formed.

The photosensitive positive resist represents a resist wherein a light-irradiated portion is remained and a non-irradiated portion is removed at a developing process.

After the photosensitive resist is dried up, the substrate 10 is installed to an exposure apparatus for exposing spiral guide tracks.

The substrate 10 is installed to the exposure apparatus with the adjustment for achieving a small amount of eccentricity of two depressions 4 and guide tracks, upon mounting the hub 8 by using the hub mounting apparatus.

The exposed substrate 10 is developed by a developer to obtain guide tracks that serve as the information recording area 2.

The developed substrate 10, i.e., the disc master, is mounted to a sputtering apparatus to form an Ni metal film with a thickness of 50 nm.

An electroforming process is executed by using a doping of Ni metal plating with the metal film serving as an electrode, to thereby obtain a stamper having a thickness of 0.3 mm. Two depressions 4 formed on the disc master are transferred onto this stamper, resulting in that two projections are formed on the stamper having a height of 0.2 mm.

The inside and outside diameters of the stamper are stamped out so as to match with the shape of the injection molding apparatus for performing an injection molding, and then, it is mounted to the injection molding apparatus. Resin such as polycarbonate or the like is melted to be flown into the molding for forming the disc substrate 1 with a thickness of 0.6 mm. Two projections formed on the stamper are transferred onto the disc substrate 1 as two depressions 4 having a depth of 0.2 mm.

Formed on the disc substrate 1 by the sputtering apparatus are dielectric film, metal magnetic film and reflective film. Thereafter, a back coat resin is applied thereon for coating the film to thereby obtain the disc-like information recording medium.

Subsequently, resin such as ultraviolet curing resin or the like is coated with a thickness of 20 microns at the position where the hub 8 of the disc-like information recording medium is mounted ( the position opposite to a collar portion).

It is desirable that the thickness of the ultraviolet curing resin is in the range of 0.5 to 100 microns. The thickness of the resin below 0.5 microns reduces the adhesive power between the resin and the hub 8. Such reduction of the adhesive power causes a possibility that the hub 8 may be fallen down as well as a possibility that a warpage of the disc substrate 1 and the increase in the birefringence are entailed when the metal hub 8 is used, since the difference in a thermal expansion coefficient between the hub 8 and the disc substrate 1 cannot be absorbed by the elastic force of the resin. When the thickness of the resin exceeds 100 microns, an extrusion of the resin and the inclinedly fixed hub 8 may occur.

The disc-like information recording medium coated with the ultraviolet curing resin is placed on the disc supporting table 5 of the hub mounting apparatus as shown in FIG. 3. The hub 8 that is to be secured is supported with high accuracy to the hub fixing member 6 of the hub mounting apparatus.

Upon installing the hub 8, only the positioning member 7 of the hub mounting apparatus is firstly moved downward for getting in contact with the disc substrate 1. Two depressions 4 formed on the disc substrate 1 are fitted to two projections 9 formed on the positioning member 7, thereby achieving the position alignment of the hub 8 and the disc substrate 1. This position alignment may be achieved by a process of moving the disc substrate 1 or by a process of moving the hub mounting apparatus.

After finishing the position alignment, the hub fixing member 6 is moved downward to install the hub 8 to the disc substrate 1. Thereafter, ultraviolet ray is irradiated to cure the ultraviolet curing resin for fixing the hub.

Figure 22:
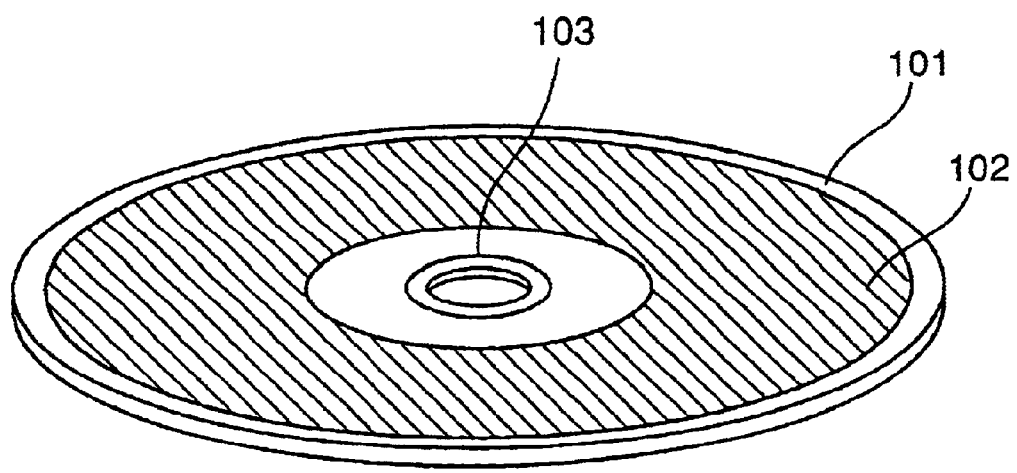
FIG. 22 is a typical perspective view of a conventional disc-like information recording medium.
Figure 23:
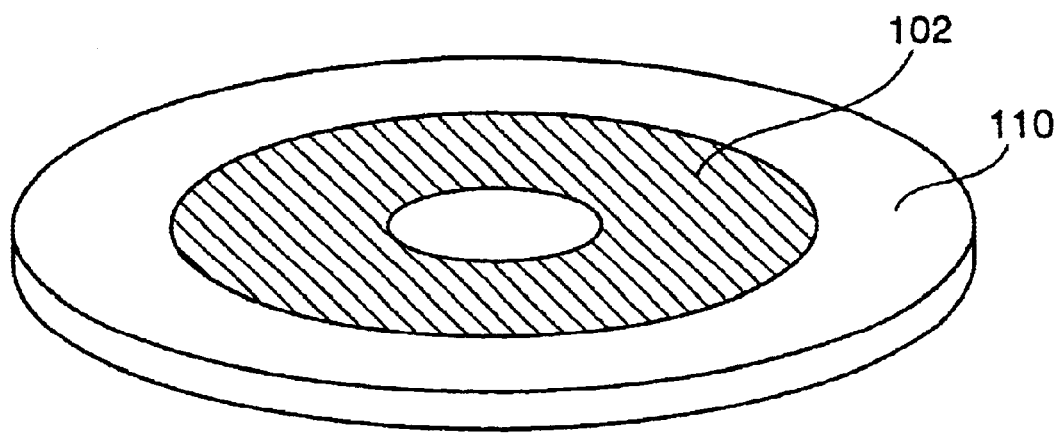
FIG. 23 is a typical perspective view of a disc master for manufacturing the conventional disc-like information recording medium shown in FIG. 22.
Figure 24:
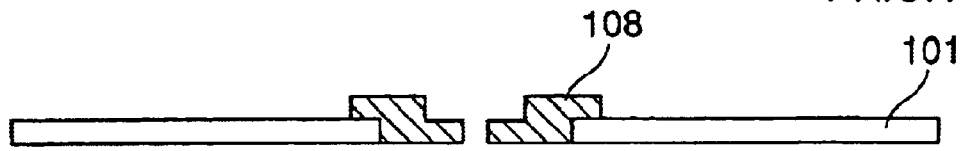
FIG. 24 is a typical sectional view of the conventional disc-like information recording medium shown in FIG. 22 to which a hub is installed.
Figure 25:
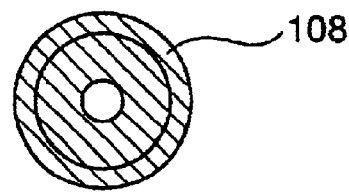
FIG. 25 is a bottom view of an essential part of a hub mounting apparatus for mounting the hub to the conventional disc-like information recording medium shown in FIG. 22.
Figure 26:
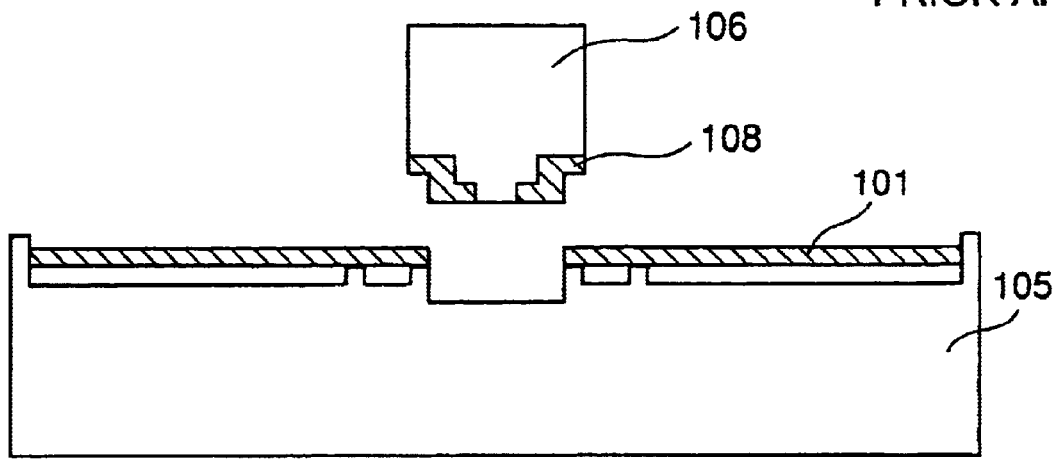
FIG. 26 is a partial sectional side view of the conventional hub mounting apparatus.

Table 1 shows a positional deviation between the rotational center of the disc and the rotational center of the guide track, i.e., a result of measuring the amount of eccentricity, with respect to the disc (sample #1) to which the hub 8 is installed by performing the position alignment according to the method of the present embodiment. For comparison, the same Table shows a result of measuring the amount of eccentricity with respect to a disc (Comparative sample #r1) having a hub 108 adhered onto a conventionally shaped disc-like information recording medium shown in FIG. 22 by using a conventional hub mounting apparatus shown in FIGS. 25 and 26 without performing an optical position alignment, and to a disc (comparative sample #r2) wherein a position alignment is performed to a conventional disc-like information recording medium with a stamper holding channel 103 as a basis by using a method disclosed in Japanese Unexamined Patent Application No. SHO 64(1989)-14747.

TABLE 1

| Centering Method | Eccentricity (μm) |
| --- | --- |
| Sample #1 | 36 |
| Comparative Sample #r1 | 224 |
| Comparative Sample #r2 | 80 |

The deviation between the rotational center of the hub 108 and the rotational center of the guide track occurs in the disc (comparative sample #r1) having the hub 108 adhered without performing the optical position alignment by using the conventional hub mounting apparatus, resulting in showing the greater amount of eccentricity 224 microns. When a laser beam was collectively irradiated to the guide track of this disc and a conventional tracking servo controlled the laser beam to track the guide track, tracking could not be achieved since the tracking exceeded the control limit of the tracking servo. This is because the deviation between the rotational center of the hub 8 and the rotational center of the guide track due to the space between the inside diameter of the disc-like information recording medium and the outside diameter of the hub 108 inserted into the disc substrate 101. Such a deviation is caused by performing no optical center alignment.

As for the disc (comparative sample #r2) wherein the position alignment is performed with the stamper holding channel 103 as the basis, the amount of eccentricity is smaller than that of the comparative sample #r1, but still great of 80 microns. When the laser beam was collectively irradiated to the guide track of this disc and the conventional tracking servo controlled the laser beam to track the guide track, tracking could not be achieved since the tracking exceeded the control limit of the tracking servo. This is because the amount of eccentricity greatly changes depending upon the precision on stamping out the inside diameter of the stamper in the method of the stamper holding channel 103 being as a basis. In other words, the greater the inside diameter of the stamper becomes in proportion to the outside diameter of the stamper holder, the greater the eccentricity becomes.

On the other hand, the amount of eccentricity is reduced down to a small value of 36 microns in the disc (sample #1) wherein the position alignment of the hub 108 is performed by the method disclosed in the present embodiment. When the laser beam was collectively irradiated to the sample #1 and the conventional tracking servo controlled the laser beam to track the guide track, it was recognized that the tracking was possible. This is because the direct formation of the depressions 4, which serve as the basis of the position alignment, on the disc master to which the guide track is formed. This shows that a disc-like information recording medium having a hub with a small amount of eccentricity can be manufactured by adjusting with high accuracy the position of the guide track and the positions of the depressions 4 serving as a basis of the position alignment, at a step of manufacturing the disc master.

Table 2 shows amounts of eccentricity of disc-like information recording mediums to which the hub 8 has already been installed respectively, when the two depressions 4 have various depth.

TABLE 2

| Disc No. | Depth of depression (mm) | Eccentricity (μm) |
| --- | --- | --- |
| No. 20 | 0.05 | 88 |
| No. 21 | 0.1 | 40 |
| No. 22 | 0.2 | 36 |
| No. 23 | 0.3 | 32 |
| No. 24 | 0.4 | 32 |

The depth of the depression 4 of the comparative disc No. 20 is shallow such as 0.05 mm, so that the position alignment could not satisfactorily be performed. As a result, the amount of eccentricity becomes great of 88 microns. When the laser beam was collectively irradiated to the guide track of this disc and the conventional tracking servo controlled the laser beam to track the guide track, tracking could not be achieved since the tracking exceeded the control limit of the tracking servo.

On the other hand, the amount of eccentricity is the same or less than 40 microns with respect to the disc-like information recording mediums No. 21 to No. 24 each having the depressions 4 with a depth of 0.1 mm or more. This represents that high-precise position alignment can be performed. When the laser beam was collectively irradiated to these discs and the conventional tracking servo controlled the laser beam to track the guide track, it was recognized that the tracking was possible.

The above result represents that the depth of the depression 4 is desirably 0.1 mm or more.

As described above, the present invention discloses the formation of the depressions 4, that are for performing the positional alignment of the hub 8 and the disc-like information recording medium, on the disc master and the stamper so as not to cause the positional misalignment to the information recording area 2, and the hub mounting apparatus having the projections 9, that can be fitted to the depressions 4, provided at the position corresponding to each depression 4 of the manufactured disc-like information recording medium. The use of the hub mounting apparatus of the invention can provide high-precise positional alignment of the hub 8 with a simple method without requiring optical positional alignment as well as without enhancing the precision upon stamping out the inside diameter of the stamper.

Further, the depth of each of the formed depression 4 is made to 0.1 mm or more, whereby smaller amount of eccentricity can be obtained.

Although the depressions 4 are formed in advance by a machinery process on the substrate 10 of the disc master in the present embodiment, it is not limited to such method if the projections are transferred onto the stamper with high precision.

The present embodiment shows an example of forming the hemispherical depression 4 at two positions, it is not limited to this example. Specifically, the shape and number of the depression may be varied depending upon being capable of performing the positional alignment. Moreover, a combination of depression and projection may be adopted.

Although the hub 8 is adhered by using the ultraviolet curing resin in this embodiment, it is possible to adopt a hot melting method or a ultrasonic fusing method for installing the hub 8 if the positional alignment method of the present embodiment is used.

Although the present embodiment shows an example of forming the depression 4 at the inner side of the information recording area 2, it may be formed at the outer side of the information recording area 2.

[Second Embodiment]

The second embodiment will be explained in detail with reference to FIGS. 5 to 8. For convenience of explanation, members having the same function and same structure as those shown in the first embodiment are marked with the same numerals for omitting its detailed explanation.

A disc-like information recording medium of this embodiment has hemispherical projections 11 at two positions formed outside of the outer peripheral surface of the stamper holding channel 3 on a disc substrate 32 as well as inside of the inner peripheral surface of the information recording area 2 that is provided with guide tracks or pit lines.

Figure 6:
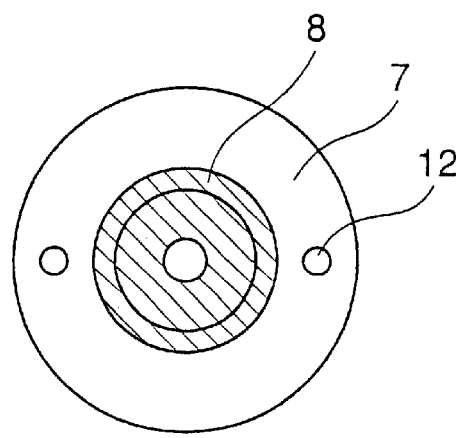
FIG. 6 is a bottom view of an essential part of a hub mounting apparatus used in the second embodiment.
Figure 7:
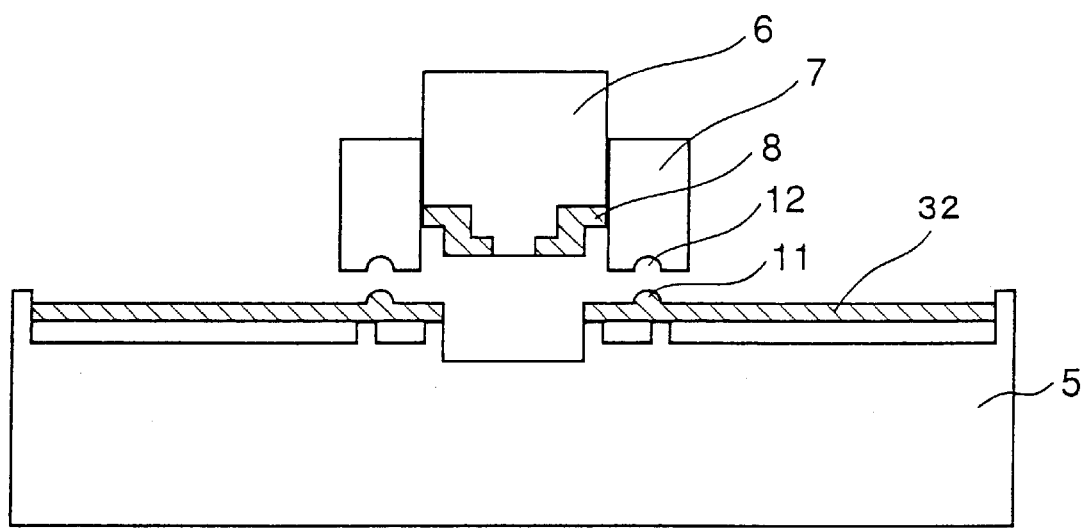
FIG. 7 is a partial sectional side view of the hub mounting apparatus used in the second embodiment.

As shown in FIGS. 6 and 7, a hub mounting apparatus for mounting the hub 8 to the disc-like information recording medium is provided with the positioning member 7 for performing the positional alignment of the disc substrate 32 and the hub 8. The positioning member 7 has two hemispherical depressions 12 on the surface that is in contact with the disc substrate 32, each depression being formed at the position corresponding to each of two hemispherical projections 11 formed on the disc substrate 32. The positioning member 7 can be operated independent of the hub fixing member 6 that is provided for mounting the hub 8 to the disc substrate 32.

Figure 8:
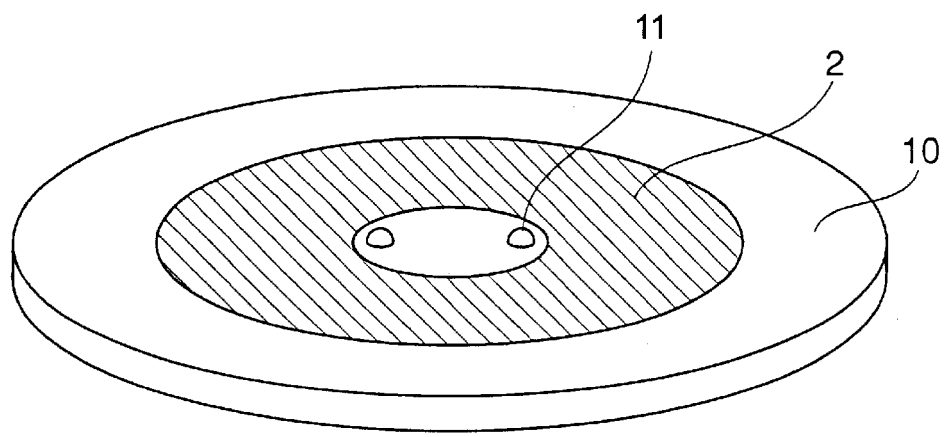
FIG. 8 is a typical perspective view of a disc master for manufacturing the disc-like information recording medium shown in FIG. 5.
Figure 9:
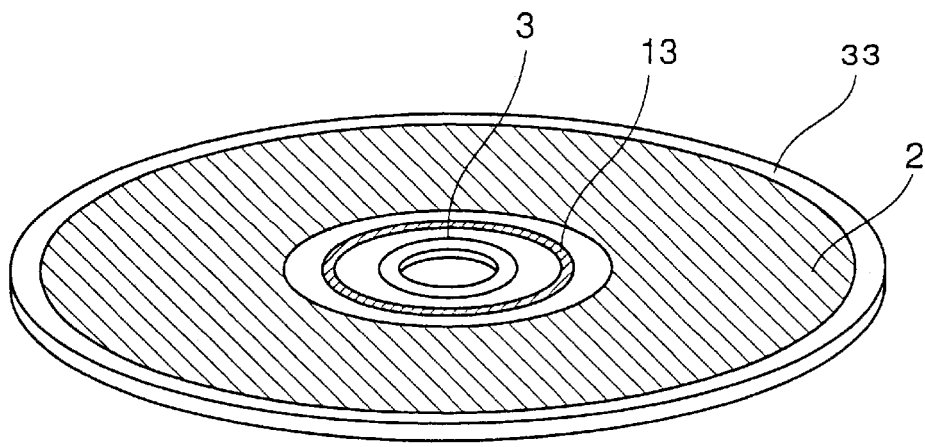
FIG. 9 is a typical perspective view of a disc-like information recording medium according to a third embodiment of the present invention.

The following explanation shows a manufacturing process of the disc-like information recording medium of the present embodiment. FIG. 8 shows a typical perspective view of a disc master for manufacturing the disc-like information recording medium according to the present invention.

In the present embodiment, a silica glass disc is used, similar to the first embodiment, as a substrate 10 of the disc master for manufacturing the disc-like information recording medium. Two hemispherical projections 11 are formed in advance at the inside of the information recording area 2 on which guide tracks or pit lines are arranged by dropping to cure the ultraviolet curing resin. The depth of each projection 11 is 0.2 mm.

Each of these two hemispherical projections 11 has a shape which can be fitted to two depressions 12 formed on the positioning member 7 of the hub mounting apparatus. The distance between the centers of two projections 11 formed on the substrate 10 is adjusted so as to be equal to the distance between the centers of two depressions 12 formed on the positioning member 7.

The substrate 10 provided with two projections 11 are installed to a spinning coater for uniformly applying the photosensitive positive resist, that is the same one used in the first embodiment, with a thickness of 100 nm on the side outside of the portion where two projections 11 are formed.

After the photosensitive resist is dried up, the exposure and development are performed by the same manner as in the first embodiment to obtain a disc master.

The disc master is mounted to the sputtering apparatus to form an Ni metal film with a thickness of 50 nm.

An electroforming process is executed by using a doping of Ni metal plating with the metal film serving as an electrode, to thereby obtain a stamper having a thickness of 0.3 mm. Two projections 11 formed on the disc master are transferred onto this stamper, resulting in that two depressions are formed on the stamper having a depth of 0.2 mm.

The inside and outside diameters of the stamper are stamped out so as to match with the shape of the injection molding apparatus for performing an injection molding, and then, it is mounted to the injection molding apparatus. Resin such as polycarbonate or the like is melted to be flown into the molding for forming the disc substrate 32 with a thickness of 0.6 mm. Two depressions formed on the stamper are transferred onto the disc substrate 32 as two projections having a height of 0.2 mm.

Formed on the disc substrate 32 by the sputtering apparatus are dielectric film, metal magnetic film and reflective film. Thereafter, a back coat resin is applied thereon for coating the film to thereby obtain the disc-like information recording medium.

Subsequently, resin such as ultraviolet curing resin or the like is coated with a thickness of 20 microns at the position where the hub 8 of the disc-like information recording medium is mounted ( the position opposite to the collar portion).

The disc-like information recording medium coated with the ultraviolet curing resin is placed on the disc supporting table 5 of the hub mounting apparatus as shown in FIG. 7. The hub 8 that is to be secured is supported with high accuracy to the hub fixing member 6 of the hub mounting apparatus.

Upon installing the hub 8, only the positioning member 7 of the hub mounting apparatus is firstly moved downward for getting in contact with the disc substrate 32. Two projections 11 formed on the disc substrate 32 are fitted to two depressions 12 formed on the positioning member 7, thereby achieving the position alignment of the hub 8 and the disc substrate 32. This position alignment may be achieved by a process of moving the disc substrate 1 or by a process of moving the hub mounting apparatus.

After finishing the position alignment, the hub fixing member 6 is moved downward to install the hub 8 to the disc substrate 32. Thereafter, ultraviolet ray is irradiated to cure the ultraviolet curing resin for fixing the hub.

The result of measuring the amount of eccentricity with respect to the disc (sample #2) having the hub 8 installed by the above method shows a small amount of eccentricity of 36 microns. When a laser beam was collectively irradiated to this disc and a conventional tracking servo controlled the laser beam to track the guide track, it was recognized that the tracking was possible.

As described above, the present invention discloses the formation of the projections 11, that are for performing the positional alignment of the hub 8 and the disc-like information recording medium, on the disc master and the stamper so as not to cause the positional misalignment to the information recording area 2, and the hub mounting apparatus having the depressions 12, that can be fitted to the projections 11, provided at the position corresponding to each projection 11 of the manufactured disc-like information recording medium. The use of the hub mounting apparatus of the invention can provide high-precise positional alignment of the hub 8 with a simple method without requiring optical positional alignment as well as without enhancing the precision upon stamping out the inside diameter of the stamper.

The amount of eccentricity of the disc information recording medium to which the hub 8 is mounted was measured by varying the height of the formed projection 11 within the range of 0.05 mm to 0.4 mm. The result represents that the projection height of 0.1 mm or more provides the amount of eccentricity of 40 microns or less, which means that the disc-like information recording medium capable of tracking the guide track by using the tracking servo can be manufactured with the projection 11 having a height of 0.1 mm or more.

Although the projection 11 are formed on the substrate 10 in the present embodiment by dropping to cure the ultraviolet curing resin onto the substrate 10, it is not limited to such method if the projections 11 that can be used for the positional alignment can be formed. Its material is not limited to the ultraviolet curing resin. A thermal curing resin may be used, or a member processed into a projection shape may be adhered onto a silica glass.

The present embodiment shows an example of forming the hemispherical projection 11 at two positions, it is not limited to this example. Specifically, the shape and number of the projection may be varied depending upon being capable of performing the positional alignment. Moreover, a combination of depression and projection may be adopted.

Although the hub 8 is adhered by using the ultraviolet curing resin in this embodiment, it is possible to adopt a hot melting method or a ultrasonic fusing method for installing the hub 8 if the positional alignment method of the present embodiment is used.

Although the present embodiment shows an example of forming the projection 11 at the inner side of the information recording area 2, it may be formed at the outer side of the information recording area 2.

[Third Embodiment]

The third embodiment will be explained in detail with reference to FIGS. 9 to 12. For convenience of explanation, members having the same function and same structure as those shown in the first and second embodiments are marked with the same numerals for omitting its detailed explanation.

A disc-like information recording medium of this embodiment has a circular depression 13 formed outside of the outer peripheral surface of the stamper holding channel 3 on a disc substrate 33 as well as inside of the inner peripheral surface of the information recording area 2 that is provided with guide tracks or pit lines.

In the injection molding method for molding the disc substrate 33 by installing the stamper to the injection molding apparatus, a circular stamper holding channel 3 can be formed on the disc substrate 33 by a member for holding the stamper (stamper holder). However, this stamper holding channel 3 deviates from the information recording area 2 provided with guide tracks or pit lines depending upon the stamping-out precision of the stamper or a installation manner as described in the first embodiment. Therefore, the stamper holding channel 3 is unsuitable for using the positional alignment.

Different from the stamper holding channel 3, the circular depression 13 of the present embodiment is manufactured such that the substrate 10 of the disc master is processed by the same manner as in the first embodiment.

Figure 10:
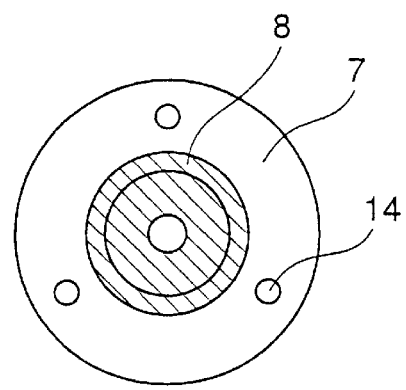
FIG. 10 is a bottom view of an essential part of a hub mounting apparatus used in the third embodiment.
Figure 11:
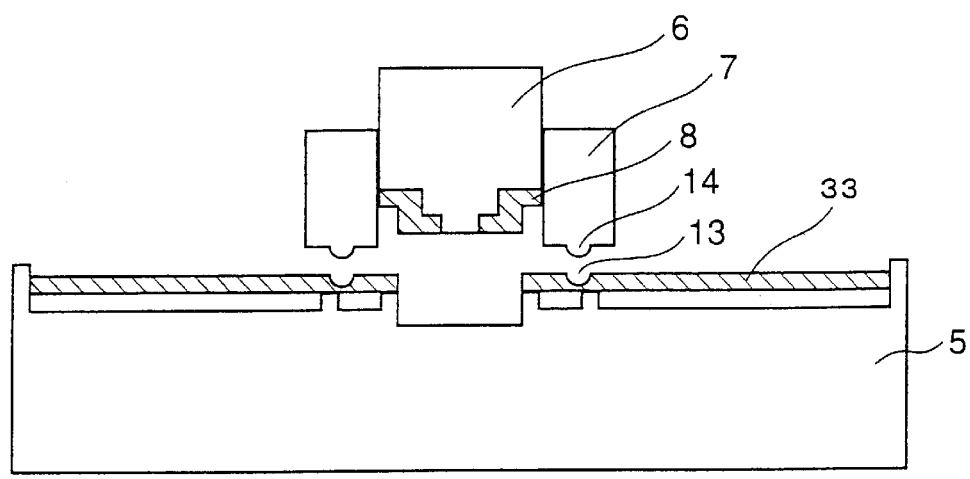
FIG. 11 is a partial sectional side view of the hub mounting apparatus used in the third embodiment.

As shown in FIGS. 10 and 11, a hub mounting apparatus for mounting the hub 8 to the disc-like information recording medium is provided with the positioning member 7 for performing the positional alignment of the disc substrate 33 and the hub 8. The positioning member 7 has three hemispherical projections 14 on the surface that is in contact with the disc substrate 33, each projection being formed at the position corresponding to the circular depression 11 formed on the disc substrate 33. The positioning member 7 can be operated independent of the hub fixing member 6 that is provided for mounting the hub 8 to the disc substrate 33.

Figure 12:
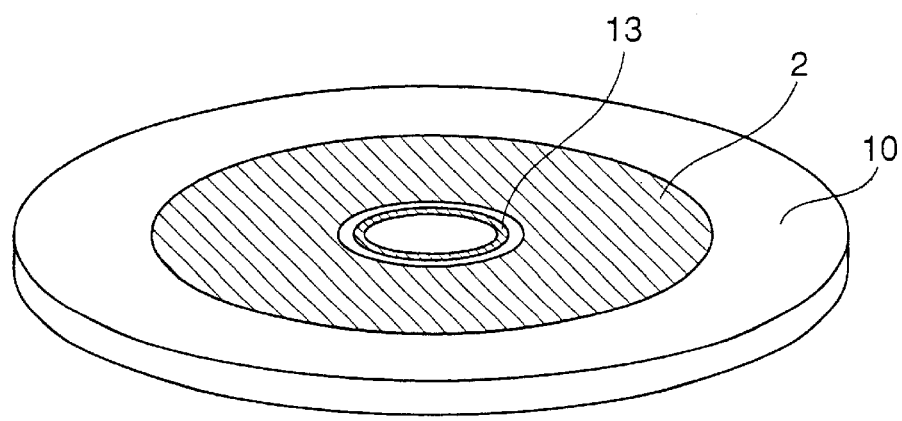
FIG. 12 is a typical perspective view of a disc master for manufacturing the disc-like information recording medium shown in FIG. 9.

The following explanation shows a manufacturing process of the disc-like information recording medium of the present embodiment. FIG. 12 shows a typical perspective view of a disc master for manufacturing the disc-like information recording medium according to the present invention.

In the present embodiment, a silica glass disc is used, similar to the first and second embodiments, as a substrate 10 of the disc master for manufacturing the disc-like information recording medium. The circular depression 13 is formed in advance by a machinery process at the inside of the information recording area 2 on which guide tracks or pit lines are arranged. The depth of the circular depression is 0.2 mm.

The depth of the circular depression 13 is desirably the one obtained by the formula of (the thickness of the disc substrate 33)—0.2 mm or less than that. If the depth of the circular depression 13 is greater than the above value, a flowing path of the resin is made narrow upon flowing the resin into the mold for molding the disc substrate 33 by the injection molding method, thereby entailing an imperfect transfer or increase in birefringence.

The circular depression 13 has a shape which can be fitted to three projections 14 formed on the positioning member 7 of the hub mounting apparatus. Three projections 14 formed on the positioning member 7 are adjusted so as to be positioned on the circular depression 13 formed on the substrate 10 upon installing the hub 8.

The substrate 10 provided with this circular depression 13 is installed to a spinning coater for uniformly applying the photosensitive positive resist, that is the same one used in the first and second embodiments, with a thickness of 100 nm on the side outside of the portion where the circular depression 13 is formed.

After the photosensitive resist is dried up, the exposure and development are performed by the same manner as in the first embodiment to obtain a disc master.

The disc master is mounted to the sputtering apparatus to form an Ni metal film with a thickness of 50 nm.

An electroforming process is executed by using a doping of Ni metal plating with the metal film serving as an electrode, to thereby obtain a stamper having a thickness of 0.3 mm. The circular depression 13 formed on the disc master is transferred onto this stamper, resulting in that a circular projection is formed on the stamper having a depth of 0.2 mm.

The inside and outside diameters of the stamper are stamped out so as to match with the shape of the injection molding apparatus for performing an injection molding, and then, it is mounted to the injection molding apparatus. Resin such as polycarbonate or the like is melted to be flown into the molding for forming the disc substrate 33 with a thickness of 0.6 mm. The circular projection formed on the stamper is transferred onto the disc substrate 33 as the circular depression 13 having a depth of 0.2 mm.

Formed on the disc substrate 33 by the sputtering apparatus are dielectric film, metal magnetic film and reflective film. Thereafter, a back coat resin is applied thereon for coating the film to thereby obtain the disc-like information recording medium.

Subsequently, resin such as ultraviolet curing resin or the like is coated with a thickness of 20 microns at the position where the hub 8 of the disc-like information recording medium is mounted ( the position opposite to the collar portion).

The disc-like information recording medium coated with the ultraviolet curing resin is placed on the disc supporting table 5 of the hub mounting apparatus as shown in FIG. 11. The hub 8 that is to be secured is supported with high accuracy to the hub fixing member 6 of the hub mounting apparatus.

Upon installing the hub 8, only the positioning member 7 of the hub mounting apparatus is firstly moved downward for getting in contact with the disc substrate 33. The circular depression 13 formed on the disc substrate 33 is fitted to three projections 14 formed on the positioning member 7, thereby achieving the position alignment of the hub 8 and the disc substrate 33. This position alignment may be achieved by a process of moving the disc substrate 33 or by a process of moving the hub mounting apparatus.

Since the circular depression is formed on the disc substrate 33, the positional alignment of the disc substrate 33 and the positioning member of the hub mounting apparatus can be performed with high precision even if the disc substrate 33 is rotated upon placing the disc substrate 33 onto the supporting table of the hub mounting apparatus.

After finishing the position alignment, the hub fixing member 6 is moved downward to install the hub 8 to the disc substrate 33. Thereafter, ultraviolet ray is irradiated to cure the ultraviolet curing resin for fixing the hub.

The result of measuring the amount of eccentricity with respect to the disc (sample #3) having the hub 8 installed by the above method shows a small amount of eccentricity of 32 microns. A small amount of eccentricity was obtained compared to the disc-like information recording medium manufactured in each of the first and second embodiments. This is because the positional alignment precision is enhanced by increasing the number of the projection 14 formed on the positioning member 7 of the hub mounting apparatus to three.

When a laser beam was collectively irradiated to this disc and a conventional tracking servo controlled the laser beam to track the guide track, it was recognized that the tracking was possible.

As described above, the present invention discloses the formation of the circular depression 13, that is for performing the positional alignment of the hub 8 and the disc-like information recording medium, on the disc master and the stamper so as not to cause the positional misalignment to the information recording area 2, and the hub mounting apparatus having the projections 14, that can be fitted to the depression 13, provided at the position corresponding to the circular depression 13 of the manufactured disc-like information recording medium. The use of the hub mounting apparatus of the invention can provide high-precise positional alignment of the hub 8 with a simple method without requiring optical positional alignment as well as without enhancing the precision upon stamping out the inside diameter of the stamper.

The amount of eccentricity of the disc information recording medium to which the hub 8 is mounted was measured by varying the depth of the formed circular depression 13 within the range of 0.05 mm to 0.4 mm. The result represents that the projection depth of 0.1 mm or more provides the amount of eccentricity of 40 microns or less, which means that the disc-like information recording medium capable of tracking the guide track by using the tracking servo can be manufactured with the circular depression 13 having a depth of 0.1 mm or more.

Although the present embodiment shows a process for forming the circular depression 13 on the disc substrate 33, it is possible to reduce the amount of eccentricity by forming a circular projection on the disc substrate 33 while forming depressions on the positioning member 7 of the hub mounting apparatus corresponding to the circular projection.

For example, ultraviolet curing resin is dropped onto the substrate 10 for forming the circular projection having a height of 0.2 mm, to thereby manufacture a disc-like information recording medium by the method shown in this embodiment. The hub 8 is installed to the resultant medium, resulting in obtaining a small amount of the eccentricity of 34 microns.

The present embodiment shows an example of forming the circular depression or projection at one position, it is not limited to this example. Specifically, the circular depression or projection may be formed at two or more positions. Further, a combination of depression and projection may be used.

Although the present embodiment shows that hemispherical projections 14 are formed at three positions on the positioning member 7 of the hub mounting apparatus, it is not limited to this example. Specifically, the shape and number of the projection may be varied depending upon being capable of performing the precise positional alignment.

Although the hub 8 is adhered by using the ultraviolet curing resin in this embodiment, it is possible to adopt a hot melting method or a ultrasonic fusing method for installing the hub 8 if the positional alignment method of the present embodiment is used.

Although the present embodiment shows an example of forming the circular depression or projection at the inner side of the information recording area 2, it may be formed at the outer side of the information recording area 2.

[Forth Embodiment]

The fourth embodiment will be explained in detail with reference to FIG. 13. For convenience of explanation, members having the same function and same structure as those shown in the above-mentioned each embodiment are marked with the same numerals for omitting its detailed explanation.

A disc-like information recording medium shown in this embodiment is the one shown in the first embodiment, i.e., the one having two hemispherical depressions 4 formed outside of the outer peripheral surface of the stamper holding channel 3 on the disc substrate 1 as well as inside of the inner peripheral surface of the information recording area 2 provided with guide tracks or pit lines, wherein two hemispherical depressions 4 are formed on the stamper by processing.

In the first embodiment, two depressions 4 are formed on the substrate 10 by performing a machinery process. However, the process up to the stamper manufacturing is performed by the conventional method without performing any process to the substrate 10 in this embodiment. Specifically, a stamper 23 is manufactured by executing a coating of positive photosensitive resist, exposure, development, Ni film formation and electroforming.

Subsequently, two projections are formed on the stamper by using a stamper inside-diameter stamping mold shown in FIG. 13.

Figure 13:
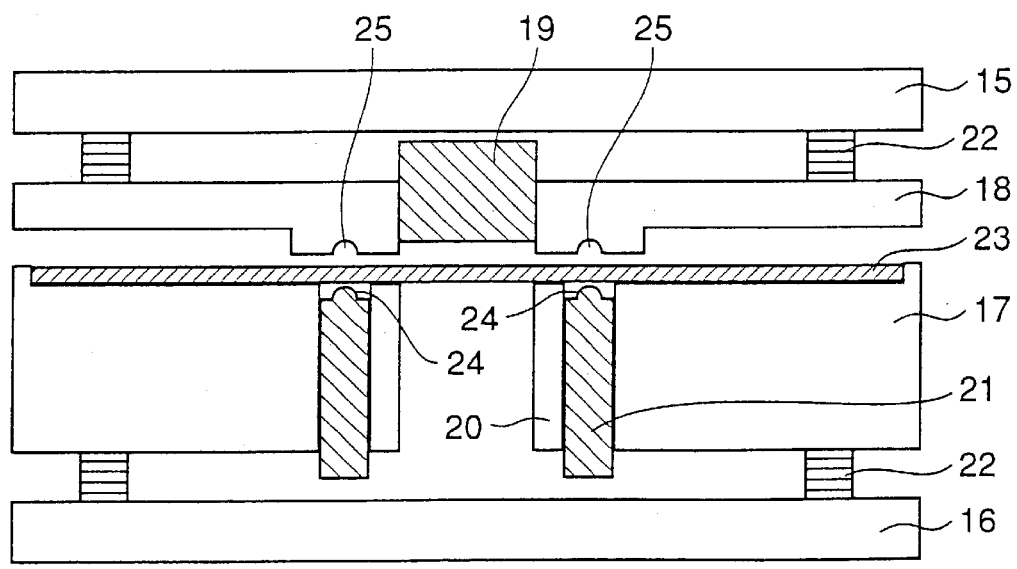
FIG. 13 is a typical sectional view of an inside diameter stamping apparatus for stamping out an inside diameter of a stamper for manufacturing a disc-like information recording medium of a fourth embodiment according to the present invention.

As shown in FIG. 13, a stamper inside-diameter stamping apparatus is provided with an upper plate 15, lower plate 16, stamper fixing table 17, stamper upper surface holding member 18, inside-diameter stamping inside member 19, inside-diameter stamping outside member 20, push processing member 21 and spring portion 22. This is an apparatus for stamping the inside diameter of the stamper 23 by applying a load to the upper plate 15.

Formed on the surface of the push processing member 21 that is in contact with the stamper 23 are two projections 24, while two depressions 25 are formed on the stamper upper surface holding member 18 corresponding to two projections.

The process for stamping the inside diameter of the stamper 23 will be explained. Firstly, rotational center of the inside-diameter stamping outside member 20 is coincided with the rotational center of the guide track formed at the stamper 23 by an optical technique to fix the stamper to the fixing table.

Subsequently, the stamper upper surface holding member 18 is pushed to the stamper 23 by applying a load to the upper plate 15 with a hydraulic pressing machine so as to hold the stamper 23 without causing a deviation by pushing the area inside of the information recording area 2. Further, the application of the load to the upper plate 15 moves the inside-diameter stamping inside member 19 downward to thereby stamp out the inside diameter of the stamper 23.

At this time, the push processing member 21 is pushed up and two projections 24 are fitted to two depressions 25, whereby the inside diameter of the stamper 23 is stamped out as well as projections are formed on the stamper 23.

In the stamper inside-diameter stamping apparatus of this embodiment, the inside and outside peripheral surfaces of the push processing member 21 serve as a holding member for holding the stamper, whereby the stamper is not deformed and the projections that become a basis for the position alignment upon installing the hub can be formed with a satisfactory shape.

The processes for forming the disc substrate 1, forming film, coating a protective resin and installing the hub are performed by using the stamper with the method same as the one shown in the first embodiment to manufacture a disc-like information recording medium.

The result of measuring the amount of eccentricity with respect to the disc (sample #4) shows a small amount of eccentricity of 30 microns. When a laser beam was collectively irradiated to this disc and a conventional tracking servo controlled the laser beam to track the guide track, it was recognized that the tracking was possible.

As described above, the present invention discloses the formation of the circular projection, that is for performing the positional alignment of the center of the hub 8 and the center of the disc-like information recording medium, on the stamper so as not to cause the positional misalignment to the information recording area 2, and the hub mounting apparatus having the depressions, that can be fitted to the projections, provided at the position corresponding to the projection of the manufactured disc-like information recording medium. The use of the hub mounting apparatus of the invention can provide high-precise positional alignment of the hub 8 with a simple method without requiring optical positional alignment as well as without enhancing the precision upon stamping out the inside diameter of the stamper.

Although a relief portion is partly provided at the inside diameter stamping apparatus for stamping the stamper inside diameter as well as a relief portion, serving as a basis for positional alignment upon installing the hub 8, is formed on the non-recording area of the stamper, it is possible to provide the relief portion to the outside diameter stamping apparatus. Further, the relief portion may be provided at a mold that is capable of simultaneously stamping inside and outside diameters.

In the present embodiment, the push processing member 21 is mounted at the side of the stamper holding table 17 of the inside diameter stamping apparatus for forming the projection on the surface of the stamper on which the guide tracks are formed, and the projection 24 is formed on the push processing member 21 at the side that is in contact with the stamper. In case where a depression is formed on the stamper at the surface on which the guide tracks are formed, the push processing member 21 is not required, but the depression may be formed on the stamper holding table 17 and the projection may be formed on the stamper upper surface holding member 18.

Although the present embodiment shows that projections are formed at two positions, it is not limited to this example. Specifically, the shape and number of the projection may be varied depending upon being capable of performing the precise positional alignment.

Further, it is possible to form the depression or projection on the stamper by a method of extrusion or cut before or after stamping the inside or outside diameters without using the inside diameter stamping apparatus shown in this embodiment. However, such a process makes it difficult to establish a satisfactory positional relationship between the information recording area 2 and depression or projection with high precision. Moreover, such a process entails a problem of increasing the number of process.

[Fifth Embodiment]

The fifth embodiment will be explained in detail with reference to FIGS. 14 to 17. For convenience of explanation, members having the same function and same structure as those shown in the above-mentioned each embodiment are marked with the same numerals for omitting its detailed explanation.

Figure 14:
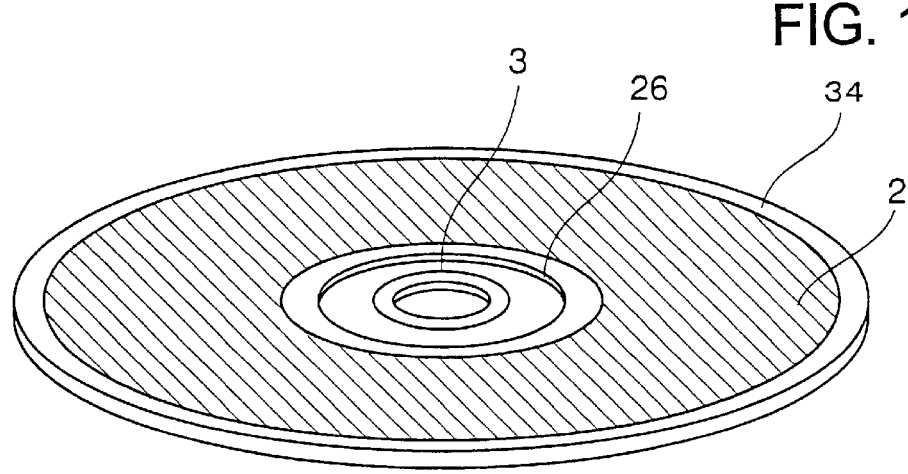
FIG. 14 is a typical perspective view of a disc-like information recording medium according to a fifth embodiment of the present invention.

As shown in FIG. 14, a disc-like information recording medium of this embodiment has a step portion 26 formed outside of the outer peripheral surface of the stamper holding channel 3 on a surface having the information recording area 2 formed thereon as well as inside of the inner peripheral surface of the information recording area 2. The thickness of the substrate is thin at the inner peripheral surface with respect to the step portion 26.

Figure 15:
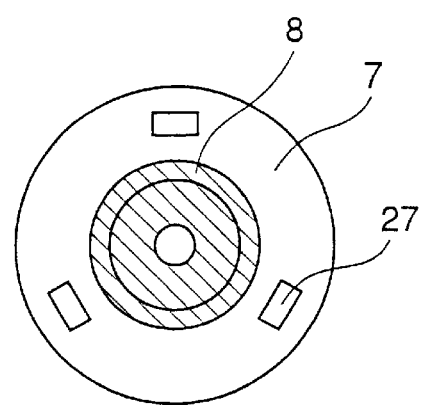
FIG. 15 is a bottom view of an essential part of a hub mounting apparatus used in the fifth embodiment.
Figure 16:
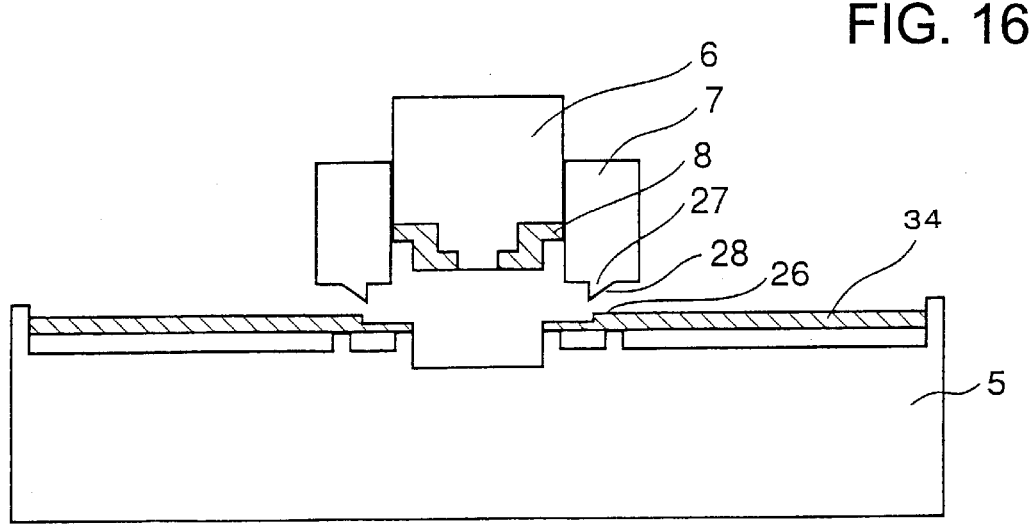
FIG. 16 is a partial sectional side view of the hub mounting apparatus used in the fifth embodiment.

As shown in FIGS. 15 and 16, a hub mounting apparatus for mounting the hub 8 to the disc-like information recording medium is provided with the positioning member 7 for performing the positional alignment of the disc-like information recording medium and the hub 8. The positioning member 7 has a saw-toothed projection 27 on the surface that is in contact with the disc substrate 34, this saw-toothed projection 27 being formed at the position corresponding to the step portion 26 formed on the disc substrate 34. The positioning member 7 can be operated independent of the hub fixing member 6 that is provided for mounting the hub 8 to the disc substrate 32.

Figure 17:
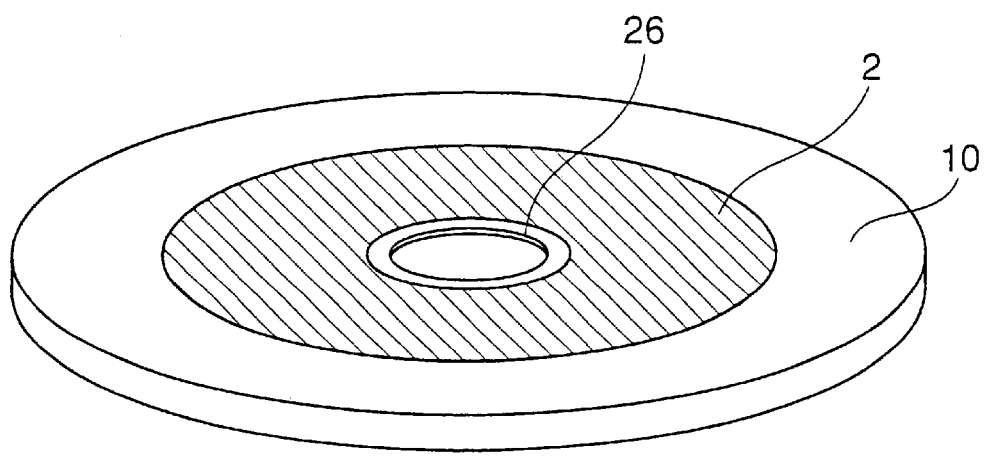
FIG. 17 is a typical perspective view of a disc master for manufacturing the disc-like information recording medium shown in FIG. 14.

The following explanation shows a manufacturing process of the disc-like information recording medium of the present embodiment. FIG. 17 shows a typical perspective view of a disc master for manufacturing the disc-like information recording medium according to the present invention.

In the present embodiment, a silica glass disc is used, similar to each embodiment, as a substrate 10 of the disc master for manufacturing the disc-like information recording medium. The area inside of the area where the guide tracks or pit lines are formed is concentrically cut by 0.2 mm with a machinery process to form the step portion 26 at the inner peripheral surface of the substrate 10.

The step portion 26 of the substrate 10 is adjusted to be positioned so that the step portion 26 of the disc substrate 32 is in contact with a taper portion of the saw-toothed projection 27 on the positioning member upon performing the position alignment by the positioning member 7 of the hub mounting apparatus.

The substrate 10 provided with two depressions is installed to a spinning coater for uniformly applying the photosensitive positive resist with a thickness of 100 nm on the side outside of the portion where the step portion 26 is formed.

The substrate 10, that has already been exposed, is developed by a developer to thereby obtain the guide tracks serving as the information recording area 2.

The disc master is mounted to the sputtering apparatus to form an Ni metal film with a thickness of 50 nm.

An electroforming process is executed by using a doping of Ni metal plating with the metal film serving as an electrode, to thereby obtain a stamper having a thickness of 0.6 mm. The step portion 26 formed on the disc master is transferred onto this stamper, resulting in that the inner peripheral surface with respect to the step portion 26 has a height higher than the outer peripheral surface with respect to the step portion 26 by 0.2 mm toward the surface on which the guide tracks are formed.

The surface of the stamper opposite to the surface thereof on which the guide tracks are formed is ground by 0.2 mm, whereby a stamper is obtained with the inner peripheral surface with respect to the step portion 26 having a thickness of 0.4 mm while with the outer peripheral surface with respect to the step portion 26 having a thickness of 0.2 mm.

The inside and outside diameters of the stamper are stamped out so as to match with the shape of the injection molding apparatus for performing an injection molding, and then, it is mounted to the injection molding apparatus. Resin such as polycarbonate or the like is melted to be flown into the molding for forming the disc substrate 34 having the inner peripheral surface of 0.4 mm with respect to the step portion 26 and the outer peripheral surface of 0.6 mm with respect to the step portion 26.

Similar to each embodiment, dielectric film, metal magnetic film and reflective film are formed on the disc substrate 34 by the sputtering apparatus. Thereafter, a back coat resin is applied thereon for coating the film to thereby obtain the disc-like information recording medium.

Subsequently, resin such as ultraviolet curing resin or the like is coated with a thickness of 20 microns at the position where the hub 8 of the disc-like information recording medium is mounted (the position corresponding to a collar portion).

The disc-like information recording medium coated with the ultraviolet curing resin is placed on the disc supporting table 5 of the hub mounting apparatus. The hub 8 that is to be secured is supported with high accuracy to the hub fixing member 6 of the hub mounting apparatus.

Upon installing the hub 8, only the positioning member 7 of the hub mounting apparatus is firstly moved downward so that the taper portion 28 of the positioning member 7 gets in contact with the step portion 26 of the disc substrate 34. This achieves the position alignment of the hub 8 and the disc substrate 34. This position alignment may be achieved by a process of moving the disc substrate 1 or by a process of moving the hub mounting apparatus.

After finishing the position alignment, the hub fixing member 6 is moved downward to install the hub 8 to the disc substrate 34. Thereafter, ultraviolet ray is irradiated to cure the ultraviolet curing resin for fixing the hub.

The result of measuring the amount of eccentricity with respect to the disc (sample #5) having the hub 8 installed by the above method shows a small amount of eccentricity of 28 microns. When a laser beam was collectively irradiated to this disc and a conventional tracking servo controlled the laser beam to track the guide track, it was recognized that the tracking was possible.

As described above, the present invention discloses the formation of the step portion 26, that is for performing the positional alignment of the hub 8 and the disc-like information recording medium, on the disc master and the stamper so as not to cause the positional misalignment to the information recording area 2, and the hub mounting apparatus having the taper portion 28, that can be in contact with the step portion 26, provided at the position corresponding to the step portion 26 of the manufactured disc-like information recording medium. The use of the hub mounting apparatus of the invention can provide high-precise positional alignment of the hub 8 with a simple method without requiring optical positional alignment as well as without enhancing the precision upon stamping out the inside diameter of the stamper.

Although this embodiment shows an example of forming the step portion 26 at the inside of the information recording area 2, the step portion 26 may be formed at the outside thereof.

Although the position alignment is performed by making the taper portion 28 get in contact with the step portion 26 in this embodiment, it is not limited to this example. Specifically, the step portion 26 and the taper portion 28 may respectively have a shape capable of performing the position alignment.

Although the step portion 26 is formed on the substrate 10 of the disc master in this embodiment, the step portion 26 may not be formed on the substrate 10 but may be formed on the stamper.

[Sixth Embodiment]

The sixth embodiment will be explained in detail with reference to FIGS. 18 to 21. For convenience of explanation, members having the same function and same structure as those shown in each of the above embodiments are marked with the same numerals for omitting its detailed explanation.

Figure 18:
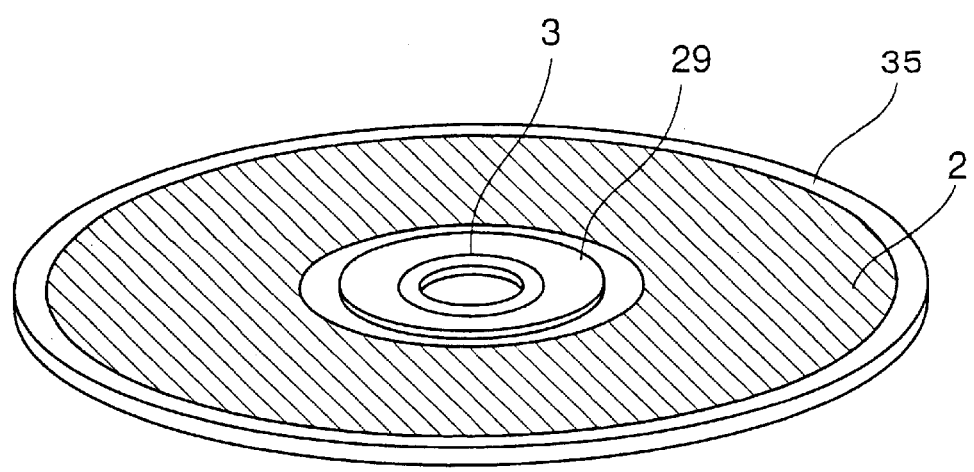
FIG. 18 is a typical perspective view of a disc-like information recording medium according to a sixth embodiment of the present invention.

A disc-like information recording medium of this embodiment has, as shown in FIG. 18, a step portion 29 formed outside of the outer peripheral surface of the stamper holding channel 3 on a surface having the information recording area 2 formed thereon as well as inside of the inner peripheral surface of the information recording area 2. The thickness of the substrate is thin at the inner peripheral surface with respect to the step portion 29.

Figure 19:
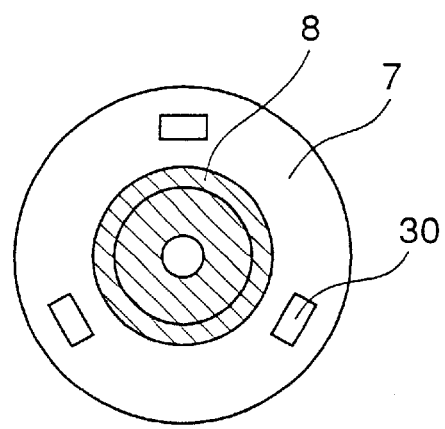
FIG. 19 is a bottom view of an essential part of a hub mounting apparatus used in the sixth embodiment.
Figure 20:
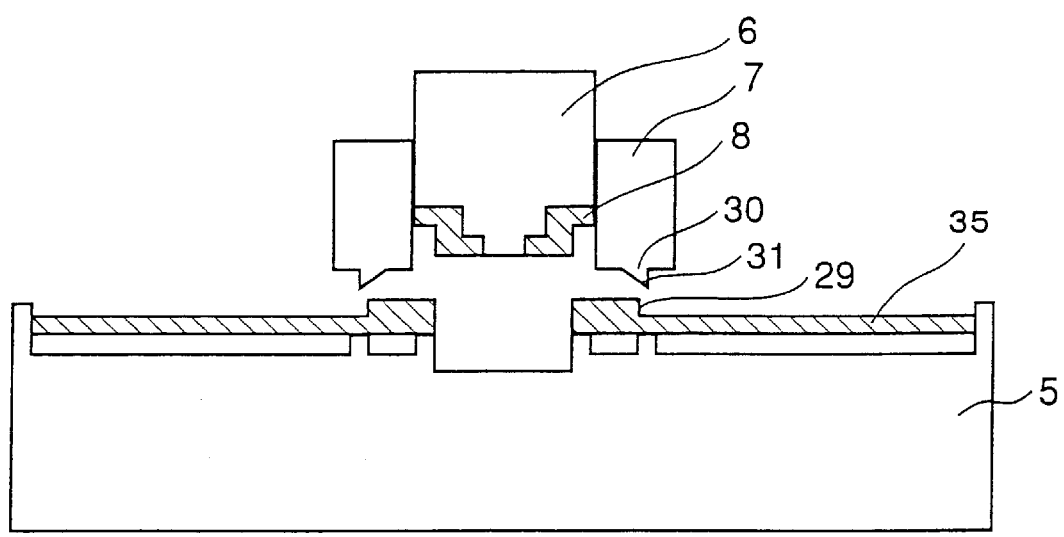
FIG. 20 is a partial sectional side view of the hub mounting apparatus used in the sixth embodiment.

As shown in FIGS. 19 and 20, a hub mounting apparatus for mounting the hub 8 to the disc-like information recording medium is provided with the positioning member 7 for performing the positional alignment of the disc-like information recording medium and the hub 8. The positioning member 7 has a saw-toothed projection 30 on the surface that is in contact with the disc substrate 35, this saw-toothed projection 30 being formed at the position corresponding to the step portion 29 formed on the disc substrate 35. The positioning member 7 can be operated independent of the hub fixing member 6 that is provided for mounting the hub 8 to the disc substrate 35.

Figure 21:
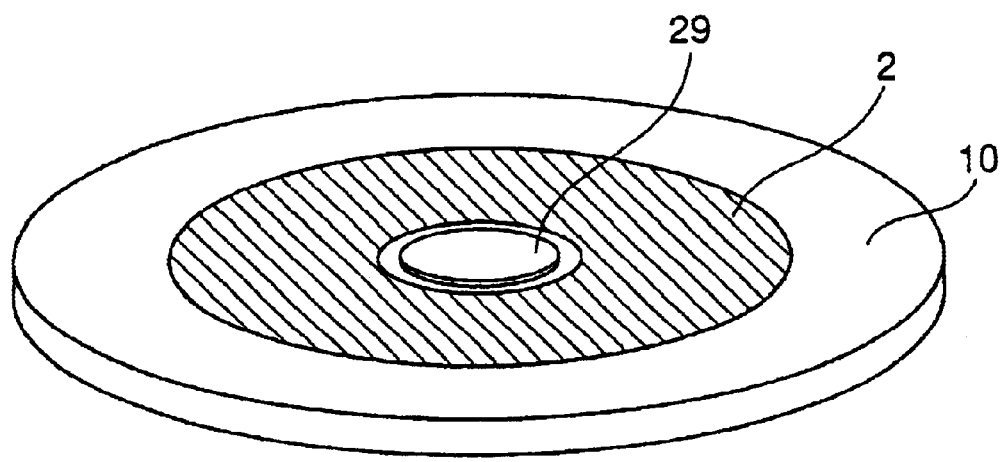
FIG. 21 is a typical perspective view of a disc master for manufacturing the disc-like information recording medium shown in FIG. 18.

The following explanation shows a manufacturing process of the disc-like information recording medium of the present embodiment. FIG. 21 shows a typical perspective view of a disc master for manufacturing the disc-like information recording medium according to the present invention.

In the present embodiment, a silica glass disc is used, similar to the each embodiment, as a substrate 10 of the disc master for manufacturing the disc-like information recording medium. The silica glass disc having a thickness of 0.2 mm is adhered by using a ultraviolet curing resin onto the area inside of the area where the guide tracks or pit lines are formed, to thereby form the step portion 29. At this time, a machinery process to form a plurality of concentric tracks cuts the adhering surface of the substrate 10. The ultraviolet curing resin is flown into these tracks to adhere the substrate 10, whereby the deviation in height or inclination due to the extrusion of the resin or the raised resin can be prevented.

The step portion 29 of the substrate 10 is adjusted to be positioned so that the step 26 of the disc substrate 35 is in contact with a taper portion 31 of the saw-toothed projection 30 formed on the positioning member upon performing the position alignment by the positioning member 7 of the hub mounting apparatus as shown in FIG. 20.

The substrate 10 provided with two depressions is installed to a spinning coater for uniformly applying the photosensitive positive resist with a thickness of 100 nm on the side outside of the portion where the step portion 29 is formed.

The substrate 10, that has already been exposed, is developed by a developer to thereby obtain the guide tracks serving as the information recording area 2.

The disc master is mounted to the sputtering apparatus to form an Ni metal film with a thickness of 50 nm.

An electroforming process is executed by using a doping of Ni metal plating with the metal film serving as an electrode, to thereby obtain a stamper having a thickness of 0.6 mm. The step portion 29 formed on the disc master is transferred onto this stamper, resulting in that the outer peripheral surface with respect to the step portion 29 has a height higher than the inner peripheral surface with respect to the step portion 29 by 0.2 mm toward the surface on which the guide tracks are formed.

The surface of the stamper opposite to the surface thereof on which the guide tracks are formed is ground by 0.2 mm, whereby a stamper is obtained with the inner peripheral surface with respect to the step portion 29 having a thickness of 0.2 mm while with the outer peripheral surface with respect to the step portion 29 having a thickness of 0.4 mm.

The inside and outside diameters of the stamper are stamped out so as to match with the shape of the injection molding apparatus for performing an injection molding, and then, it is mounted to the injection molding apparatus. Resin such as polycarbonate or the like is melted to be flown into the molding for forming the disc substrate 35 having the inner peripheral surface of 0.8 mm with respect to the step portion 29 and the outer peripheral surface of 0.6 mm with respect to the step portion 29.

Similar to each embodiment, dielectric film, metal magnetic film and reflective film are formed on the disc substrate 35 by the sputtering apparatus. Thereafter, a back coat resin is applied thereon for coating the film to thereby obtain the disc-like information recording medium.

Subsequently, resin such as ultraviolet curing resin or the like is coated with a thickness of 20 microns at the position where the hub 8 of the disc-like information recording medium is mounted (the position corresponding to a collar portion).

The disc-like information recording medium coated with the ultraviolet curing resin is placed on the disc supporting table 5 of the hub mounting apparatus. The hub 8 that is to be secured is supported with high accuracy to the hub fixing member 6 of the hub mounting apparatus as shown in FIG. 20.

Upon installing the hub 8, only the positioning member 7 of the hub mounting apparatus is firstly moved downward so that the taper portion 31 of the positioning member 7 gets in contact with the step portion 29 of the disc substrate 35. This achieves the position alignment of the hub 8 and the disc substrate 35. This position alignment may be achieved by a process of moving the disc substrate 1 or by a process of moving the hub mounting apparatus.

After finishing the position alignment, the hub fixing member 6 is moved downward to install the hub 8 to the disc substrate 35. Thereafter, ultraviolet ray is irradiated to cure the ultraviolet curing resin for fixing the hub.

The result of measuring the amount of eccentricity with respect to the disc (sample #6) having the hub 8 installed by the above method shows a small amount of eccentricity of 28 microns. When a laser beam was collectively irradiated to this disc and a conventional tracking servo controlled the laser beam to track the guide track, it was recognized that the tracking was possible.

Further, it was confirmed that the face swinging amount upon disc rotation is 20 microns, that is smaller by approximately 20 microns than the amount obtained by each disc-like information recording medium of sample #1 to sample #5. This is because the substrate has a greater thickness at the inside of the step portion 29 in the sample #6.

As described above, the present invention discloses the formation of the step portion 29, that is for performing the positional alignment of the hub 8 and the disc-like information recording medium, on the disc master and the stamper so as not to cause the positional misalignment to the information recording area 2, and the hub mounting apparatus having the taper portion 31, that can be in contact with the step portion 29, provided at the position corresponding to the step portion 29 of the manufactured disc-like information recording medium. The use of the hub mounting apparatus of the invention can provide high-precise positional alignment of the hub 8 with a simple method without requiring optical positional alignment as well as without enhancing the precision upon stamping out the inside diameter of the stamper.

Although this embodiment shows an example of forming the step portion 29 at the inside of the information recording area 2, the step portion 29 may be formed at the outside thereof.

Although the position alignment is performed by making the taper portion 31 get in contact with the step portion 29 in this embodiment, it is not limited to this example. Specifically, the step portion 29 and the taper portion 31 may respectively have a shape capable of performing the position alignment.

Although the step portion 29 is formed on the substrate 10 of the disc master in this embodiment, the step portion 29 may not be formed on the substrate 10 but may be formed on the stamper.

According to the present invention, the positioning member of the hub mounting apparatus is fitted to the relief portion of the disc substrate, thereby being capable of performing the position alignment between the center of the hub and the center of the disc substrate. As a result, a manufacturing process can be simplified as well as a disc-like information recording medium having a small eccentricity can be obtained.

What is claimed is:

1. A disc recording medium comprising:
a disc substrate having a hole at its center,
a circular information recording area at its surface that is concentric with the hole, and a hub that is fitted to the hole and secured to a surface of the substrate, wherein the disc substrate has a relief portion thereon for position alignment of the hub, the relief portion being located on the same surface of the substrate where the hub is secured to the substrate.

2. A disc-like recording medium claimed in claim 1, wherein the relief portion has a step portion having a height of 0.1 mm or more with respect to a surface of the disc substrate.

3. The disc-like recording medium claimed in claim 2, wherein the height of the step portion is 0.1 mm to 0.4 mm.

4. A disc-like recording medium claimed in claim 1, wherein the relief portion is a depression portion formed on the surface of the disc substrate.

5. A disc-like recording medium claimed in claim 1, wherein the relief portion is a projection portion formed on the surface of the disc substrate.

6. A disc-like recording medium claimed in claim 1, wherein the relief portion is a circular depression or projection that is formed so as to be concentric with the hole and has an inside diameter larger than the diameter of the hole.

7. A disc-like recording medium claimed in claim 1, wherein the relief portion is a circular depression formed along the circumference of the hole.

8. A disc-like recording medium claimed in claim 1, wherein the relief portion is a circular projection formed along the circumference of the hole.

9. The disc recording medium claimed in claim 1, wherein the disc substrate has at least two distinct relief portions thereon for position alignment of the hub.

10. The disc recording medium claimed in claim 9, wherein the relief portions are step portions having a height of 0.1 mm or more with respect to the surface of the disc substrate.

11. The disc recording medium claimed in claim 9, wherein the relief portions are depression portions formed on the surface of the disc substrate.

12. A stamper for manufacturing a disc-like recording medium provided with a disc substrate having a hole at its center and a circular information recording area at its surface that is concentric with the hole, and a hub that is fitted to the hole, wherein the disc substrate has a relief portion thereon for position alignment of the hub, the stamper having a relief portion corresponding to the relief portion of the disc substrate.

13. A stamper configuring apparatus for configuring the stamper claimed in claim 12, the stamper configuring apparatus being provided with a stamping processing section for configuring the stamper by a stamping process and a pressing processing section for forming the relief portion of the stamper by a pressing process simultaneous with the stamping process.

14. A stamper configuring apparatus claimed in claim 13, the stamper having a relief portion forming section for forming the relief portion of the stamper and holding sections for holding therebetween a peripheral part of the relief to be formed when the relief portion is formed.

15. A hub mounting apparatus for mounting the hub on a disc recording medium provided with a disc substrate having a hole at its center and a circular information recording area at its surface that is concentric with the hole, and a hub that is fitted to the hole, wherein the disc substrate has a relief portion thereon for position alignment of the hub, the apparatus having a positioning member to be fitted to the relief portion of the disc substrate, wherein the hub is installed to the disc substrate as the positioning member is being fitted to the relief portion on the surface of the disc where the hub is secured.

16. A disc recording medium comprising:
    a disc substrate having a hole at its center,
    a circular information recording area at its surface that is concentric with the hole, and
    a hub that is fitted to the hole, wherein the disc substrate has a stamper holding channel thereon and a relief portion thereon for position alignment of the hub, the stamper holding channel being coaxially formed between the hole and the circular information recording area, the relief portion being located between the stamper holding channel and the circular information recording area.

* * * * *